United States Patent
Church et al.

(10) Patent No.: US 7,258,645 B2
(45) Date of Patent: Aug. 21, 2007

(54) AXLE ASSEMBLY WITH SIDE GEARS HAVING DUAL SHAFT RETENTION FEATURES

(75) Inventors: Barbara E. Church, Allen Park, MI (US); Jeffrey S. Jackson, Fenton, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 213 days.

(21) Appl. No.: 11/183,594

(22) Filed: Jul. 18, 2005

(65) Prior Publication Data

US 2007/0015621 A1  Jan. 18, 2007

(51) Int. Cl.
F16H 48/06 (2006.01)
F16H 57/08 (2006.01)
B21D 53/28 (2006.01)
B21K 1/30 (2006.01)
B23P 15/14 (2006.01)

(52) U.S. Cl. .................. 475/230; 475/344; 29/893; 29/893.1

(58) Field of Classification Search ............ 475/230, 475/344, 332; 29/893, 893.1, 893.3
See application file for complete search history.

(56) References Cited

U.S. PATENT DOCUMENTS

| | | | | |
|---|---|---|---|---|
| 2,910,131 A | * | 10/1959 | Krotz ..................... 180/234 |
| 3,527,120 A | * | 9/1970 | Morris et al. ............ 475/235 |
| 3,605,518 A | | 9/1971 | Haller | |
| 3,651,713 A | * | 3/1972 | Mueller ................... 475/230 |
| 3,678,557 A | | 7/1972 | Howard | |
| 4,365,524 A | * | 12/1982 | Dissett et al. ............ 475/226 |
| 4,630,506 A | * | 12/1986 | Allmandinger et al. ..... 475/230 |
| 4,651,587 A | | 3/1987 | Anderson et al. | |
| 5,131,894 A | * | 7/1992 | Hilker .................... 475/230 |
| 5,516,376 A | | 5/1996 | Tsukamoto et al. | |
| 5,806,373 A | | 9/1998 | Parker | |
| 6,618,924 B1 | * | 9/2003 | Irwin ..................... 29/407.05 |

* cited by examiner

*Primary Examiner*—Tisha Lewis
(74) *Attorney, Agent, or Firm*—Harness, Dickey & Pierce, P.L.C.

(57) ABSTRACT

The drivetrain with multiple differentials includes a common side gear. The side gear has a cylindrical body with a central bore. Receiving members are on the bore to receive a shaft. An annular member is on the body with the bore extending through the annular member. A plurality of teeth is formed on an external surface of the annular member. A plurality of steps is formed in the wall defining the central bore. The steps extend towards the body from the annular member. A retaining mechanism, to retain the side gears on the shaft, is positioned in one of the plurality of the steps.

10 Claims, 5 Drawing Sheets

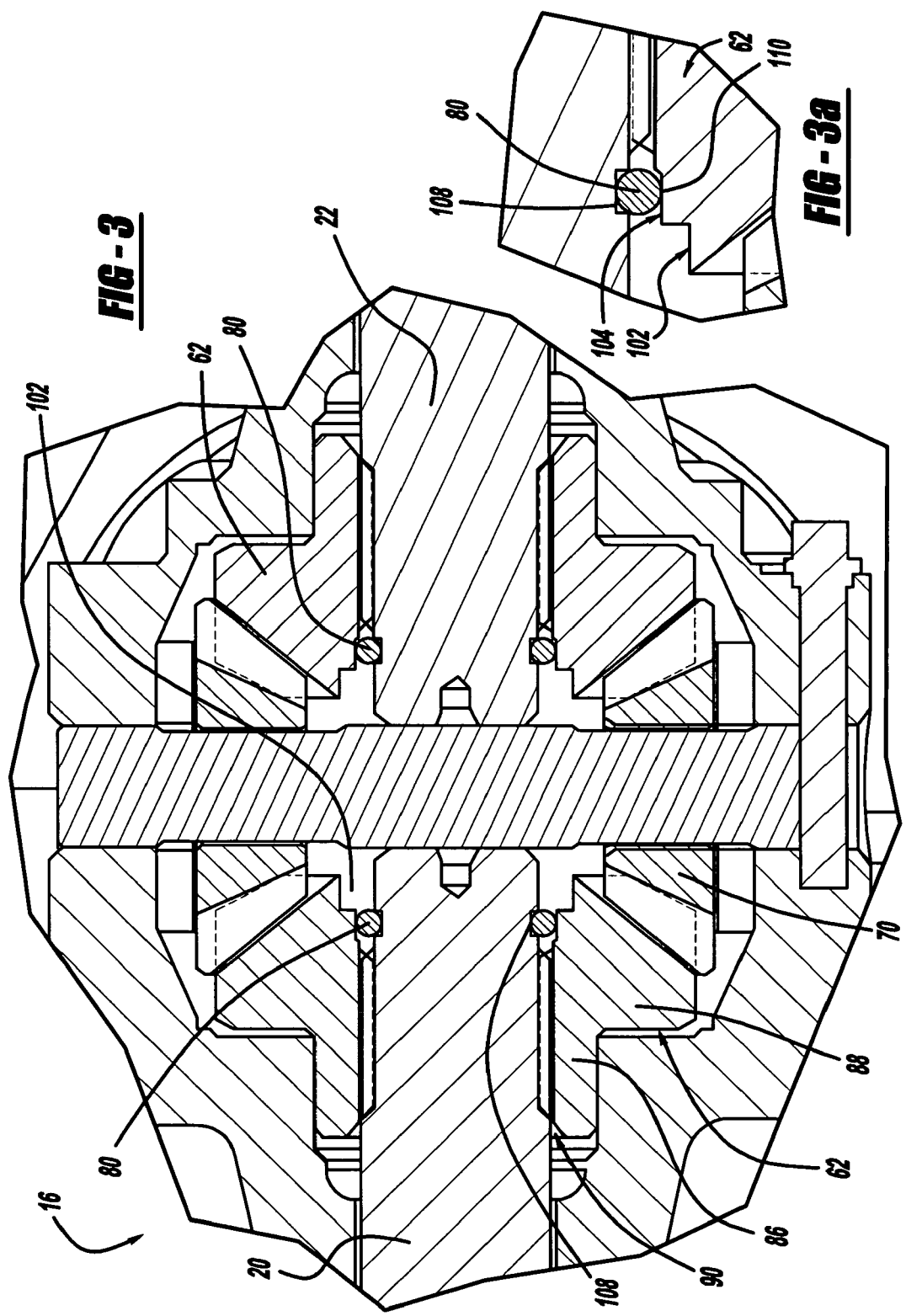

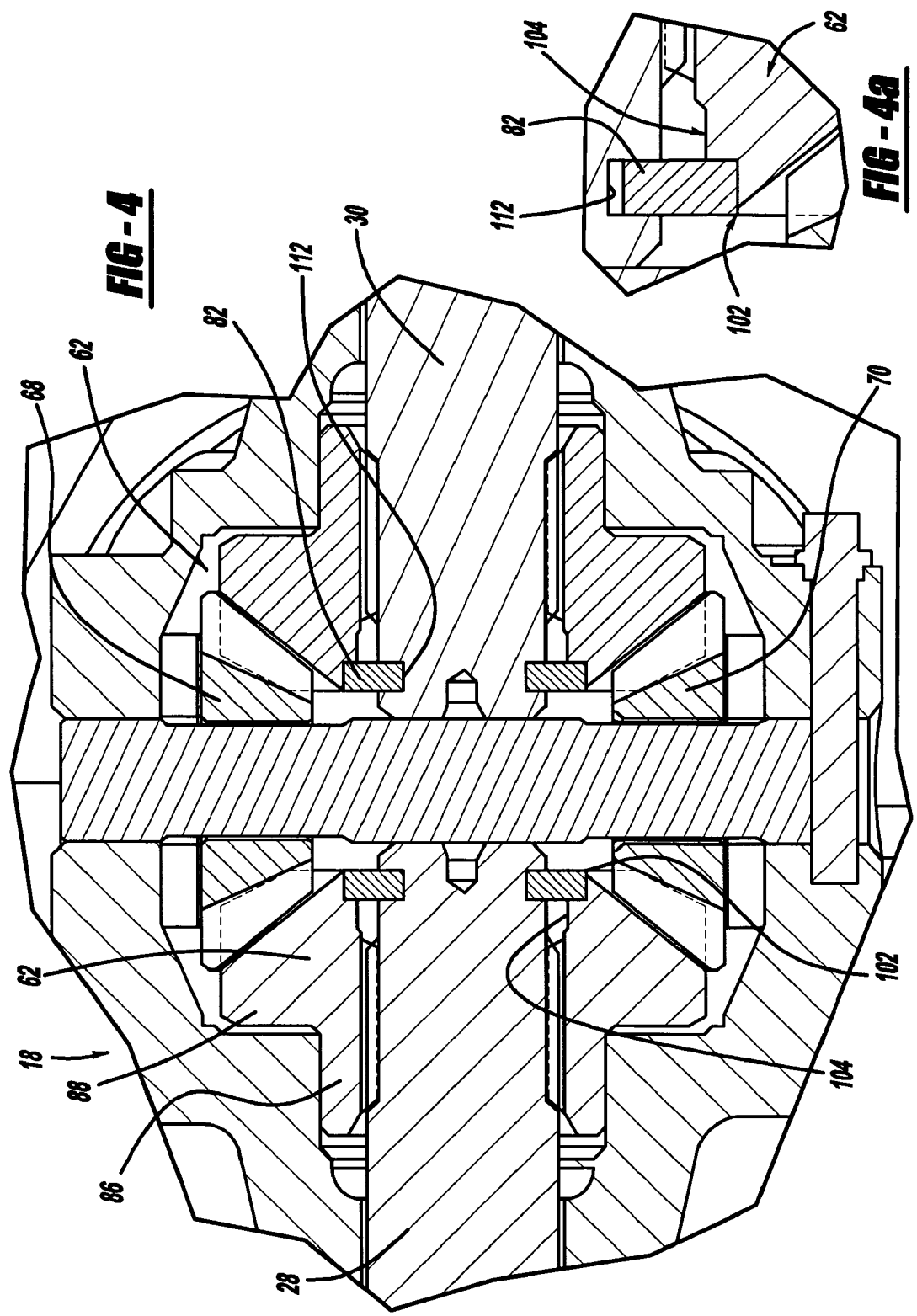

AXLE ASSEMBLY WITH SIDE GEARS HAVING DUAL SHAFT RETENTION FEATURES

BACKGROUND AND SUMMARY OF THE INVENTION

The present invention relates to vehicles and, more particularly, to vehicle drivetrains which include front and rear differentials which utilize the same side gears.

In motor vehicles, in order to transfer power from an engine to the vehicle wheels, differentials are utilized to transfer power from one rotating shaft to another. In vehicles which have four wheel or all wheel, drive, the vehicle utilizes front and rear differentials in order to transfer power to the wheels. Ordinarily in vehicles which have front and rear differentials, the differentials have different gear arrangements. Specifically, the front and rear differentials have side gears which, while looking the same, are different. Accordingly, when the differentials are built, if a front or rear side gear becomes misplaced for the other rear or front side gear, the mistake ordinarily, is not uncovered until after the differential is completely built. If a side gear is incorrectly placed into the wrong differential, the differential must be torn down in order to fix the mistake. This requires substantial man hours in order to remedy the mistake. However, due to the different requirements in the front and rear axles, different side gears are required in the different differentials. Accordingly, it would be desirable to have a single side gear which could be utilized in both the front and rear differentials in order to eliminate any type of mistake which would require tearing down and rebuilding the differential assembly.

In accordance with the present invention, a side gear is provided which can be utilized in both front and rear differentials. The present side gear provides a unitary spacer that eliminates conventional spacers and reduces weight, as well as the number of components in the differential. The present invention provides a single side gear which eliminates the possibility of placing an improper or incorrect side gear in the wrong differential. The present invention utilizes different retaining mechanisms to retain the side gears on different shafts.

In accordance with a first aspect of the invention, a side gear comprises a cylindrical body with a central bore. Receiving members are formed in the bore to receive a shaft. An annular member is unitarily formed with the cylindrical body with the bore extending through the annular member. A plurality of teeth are formed on the external surface of the annular member. A plurality of stepped portions are formed in the central bore. The stepped portions extend towards the body from the annular member. A mechanism to retain the side gear on the shaft is positioned in one of the plurality of stepped portions. A different mechanism to retain a different shaft may be positioned in a different stepped portion depending upon the differential into which it is to be placed. A snap ring may be received in one of the plurality of stepped portions. A C-lock may be retained in one of the plurality of stepped portions. When a retainer is positioned in a specific step of one of the plurality of steps, it retains a specific shaft of a plurality of shafts such that by changing the retainer, the side gear can be retained on a different shaft, wherein the side gear may be used with multiple differentials and the side gears of the differentials are the same.

According to a second aspect of the present invention, a differential comprises a housing with an input shaft that includes a pinion gear. A ring gear meshes with the pinion gear and is coupled with the rotatable housing. An axial shaft includes a first side gear rotatable with the rotatable housing. A cross pin is rotatable with the first side gear. The cross pin includes a pair of pinion gears. A second side gear is rotatable with the pair of pinion gears. The first and second side gears comprise a cylindrical body with a central bore. Receiving members are formed in the bore to receive the shaft. An annular member is unitarily formed with the cylindrical body with the bore extending through the annular member. A plurality of teeth are formed on the external surface of the annular member. A plurality of stepped portions are formed in the central bore. The stepped portions extend towards the body from the annular member. A mechanism to retain the side gear on the shaft is positioned in one of the plurality of stepped portions. A different mechanism to retain a different shaft may be positioned in a different stepped portion depending upon the differential into which it is to be placed. A snap ring may be received in one of the plurality of stepped portions. A C-lock may be retained in one of the plurality of stepped portions. When a retainer is positioned in a specific step of one of the plurality of steps, it retains a specific shaft of a plurality of shafts such that by changing the retainer, the side gear can be retained on a different shaft, wherein the side gear may be used with multiple differentials and the side gears of the differentials are the same.

According to a third aspect of the invention, a drivetrain comprises a front differential and a rear differential coupled with one another. The front differential comprises a housing with an input shaft that includes a pinion gear. A ring gear meshes with the pinion gear and is coupled with the rotatable housing. An axial shaft includes a first side gear rotatable with the rotatable housing. A cross pin is rotatable with the first side gear. The cross pin includes a pair of pinion gears. A second side gear is rotatable with the pair of pinion gears. The first and second side gears comprise a cylindrical body with a central bore. Receiving members are formed in the bore to receive the shaft. An annular member is unitarily formed with the cylindrical body with the bore extending through the annular member. A plurality of teeth are formed on the external surface of the annular member. A plurality of stepped portions are formed in the central bore. The stepped portions extend towards the body from the annular member. A mechanism to retain the side gear on the shaft is positioned in one of the plurality of stepped portions. A different mechanism to retain a different shaft may be positioned in a different stepped portion depending upon the differential into which it is to be placed. A snap ring may be received in one of the plurality of stepped portions. A C-lock may be retained in one of the plurality of stepped portions.

From the following detailed description taken in conjunction with the accompanying drawings and appended claims, the objects and advantages of the present invention will become apparent to those skilled in the art.

BRIEF DESCRIPTION OF THE DRAWINGS

The present invention will become more fully understood from the detailed description and the accompanying drawings, wherein:

FIG. 3 is an enlarged partial cross-section view of a front differential in accordance with the present invention.

FIG. 3A is an enlarged view of FIG. 3 within circle 3A.

FIG. 4 is an enlarged partial cross-section view of a rear differential in accordance with the present invention.

FIG. 4A is an enlarged view of FIG. 4 with circle 4A.

DETAILED DESCRIPTION OF THE PREFERRED EMBODIMENTS

The following description of the preferred embodiment(s) is merely exemplary in nature and is in no way intended to limit the invention, its application, or uses.

Figure 1:
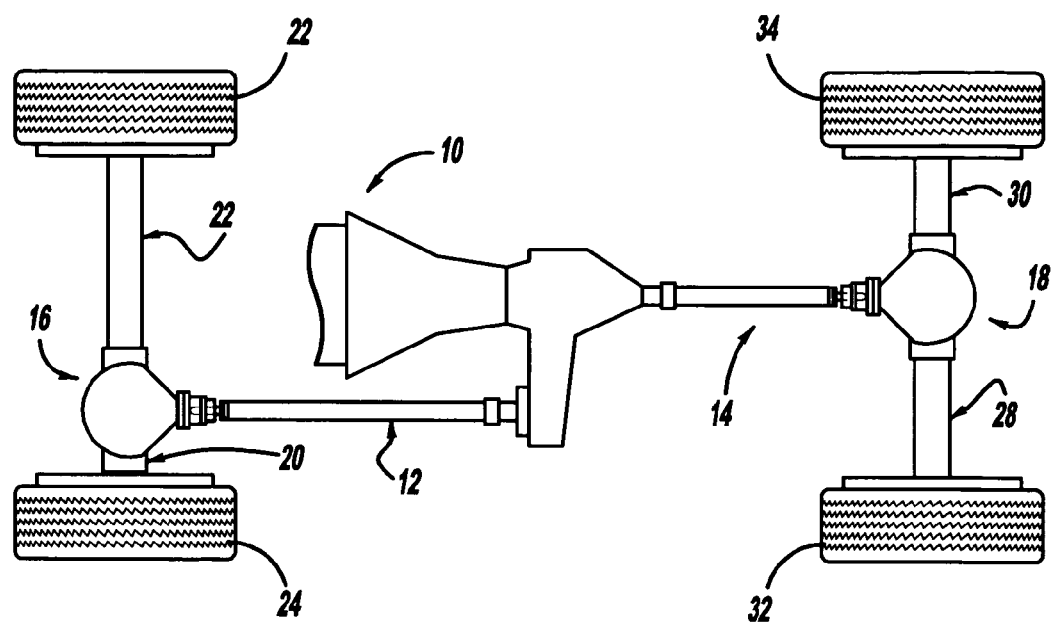
FIG. 1 is a schematic view of a drivetrain in accordance with the present invention.

Turning to the Figures, particularly FIG. 1, a driveline schematic is illustrated. The schematic includes an engine 10 and driving shafts 12 and 14. Shaft 12 is coupled with an input shaft in a front differential 16 and shaft 14 is coupled with an input shaft in a rear differential 18. The front differential 16 drives shafts 20 and 22 which, in turn, drive front wheels 24 and 26. Likewise, the rear differential 18 drives rear output axle shafts 28 and 30 which, in turn, drive wheels 32 and 34.

Figure 2:
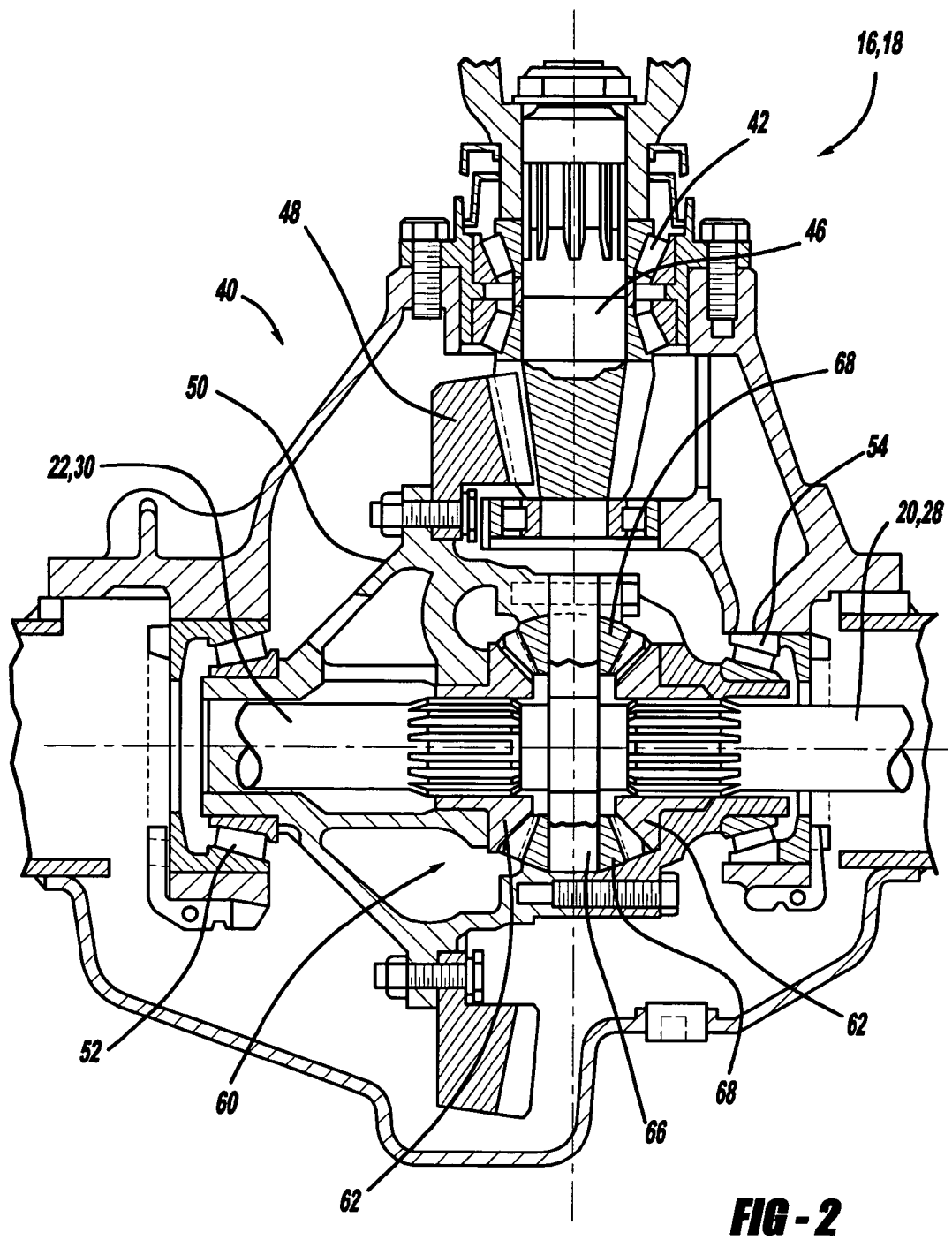
FIG. 2 is a schematical cross-section view of a differential of the present invention.

Turning to FIG. 2, a schematic of a differential is illustrated. The differential includes a housing 40 which includes a tail bearing 42 which receives a pinion 46 which rotatably meshes with a ring gear 48. The ring gear 48 is mounted on a rotatable housing 50. The rotatable housing 50 includes bearings 52 and 54 to provide rotation of the housing 50. The rotatable housing 50 includes a gear arrangement 60. The gear arrangement 60 includes two side gears 62 attached to shafts 20, 22 or 28, 30. A cross pin 66 includes two differential pinions 68. The differential pinions 68 mesh with the side gears 62 to drive the output shafts. Power is transmitted from the engine via the shafts into the output shaft which, in turn, rotates the pinion 46. The pinion 46 rotates the ring gear 48 which, in turn, rotates the rotatable housing 50. As the housing 50 rotates, side gear 62 is rotated with the housing. As this occurs, the meshing side gears 62 and pinions 68 rotate the shafts.

Turning to FIG. 3, an enlarged view of the side gears inside of the rotatable housing is shown. The side gears 62 are secured with shafts 20 and 22. The side gears 62 are retained on the shafts by snap rings 80. As seen in the cross-sectional view in FIG. 4, the side gears 62 are retained on shafts 28 and 30 via C-locks 82.

Figure 5:
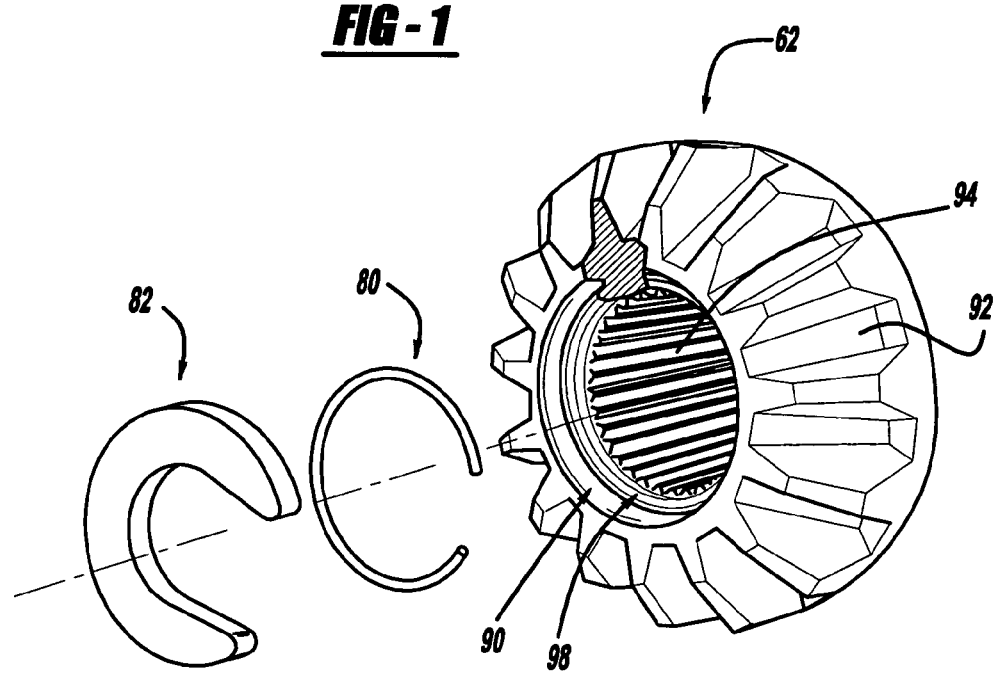
FIG. 5 is a perspective view partially in cross-section of a side gear in accordance with the present invention.
Figure 6:
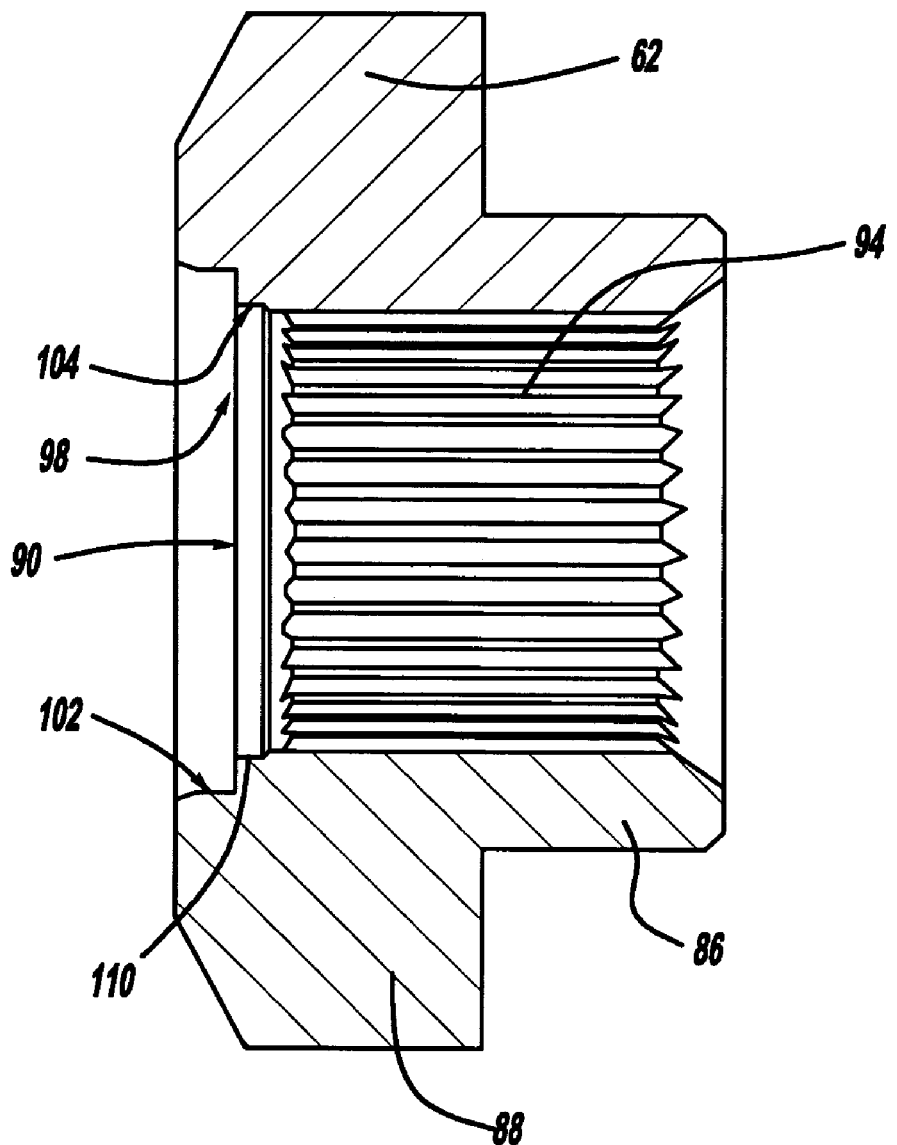
FIG. 6 is a cross-section view of a side gear in accordance with the present invention.

Turning to FIGS. 5 and 6, a partial and a cutaway view of the side gear 62 is illustrated. The side gear 62 includes a cylindrical body 86 with an annular ring member 88. A central bore 90 extends through the cylindrical body 86 and angular ring member 88 of the gear 62. An outer surface of the annular ring 88 includes teeth 92 which mesh with two pinions gears 68. The central bore 90 includes splines 94 which axially extend along the gear cylindrical body 86. The central bore 90 also includes a plurality of steps 98. The steps 98 extend from the annular ring member 88 towards the cylindrical body 86 in the central bore 90.

The steps 98 include a first step 102 and a second step 104. The first step 102, peripherally positioned around the bore 90, has a diameter larger than that of the peripherally positioned second step 104. The second step 104 has a diameter designed to receive the snap ring 80. The first step 102 has a diameter sized to receive the C-lock 82. The second step 104 is such that the snap ring 80, while in the second step 104, extends into a groove 108 in the shaft 20, 22, as seen in FIGS. 3 and 3A. The snap ring 80 is retained by a force exerted by the wall 110 which defines the step 104, in the groove 108 to retain the side gear 62 on the shaft. In the front differential as seen in FIG. 3, the annular ring member 88, since the step 104 is spaced a desired distance from the end of the annular ring member 88, acts as a spacer in the differential to eliminate the need for a separate spacer. Thus, the weight, as well as the cost of the differential, is reduced.

When utilizing the side gear 62 in the rear differential, the C-lock 82 is utilized, as seen in FIG. 4A. The C-lock 82 has a diameter such that it fits into the first step 102. When the C-lock 82 is positioned in the step 102, it locks into the groove 112 in the shaft 28, 30 to retain the side gears 62 in position. Thus, a single side gear 62 can be utilized in both the front and rear differential. Depending upon which retaining mechanism is used, the side gears 62 are positioned on the proper axle shaft. Since the axle grooves 108, 112 dictate the fastener used, the workman is able to determine which retaining mechanism 80, 82 is used while using the same gear 62. Thus, by having multiple steps 102, 104, which receive different retaining members 80, 82, the same gear 62 can be utilized in multiple differentials with different axle shaft. This eliminates the mistake of utilizing the wrong gear in a differential.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A side gear for a differential comprising:
a body having a bore, at least a portion of the bore having a non-circular cross-sectional shape that is adapted to non-rotatably engage a shaft to transmit rotary power therebetween;
a plurality of side gear teeth coupled to the body, the side gear teeth being adapted to meshingly engage a plurality of teeth formed on a pinion gear;
wherein first and second counterbores are formed in one end of the body, the first counterbore having a first diameter and extending a first distance into the body, the second counterbore intersecting the first counterbore, the second counterbore having a second diameter and extending a second distance into the body, wherein the first diameter is greater than the second diameter and the first distance is smaller than the second distance.

2. The side gear of claim 1, wherein the non-circular cross-sectional shape is defined by a plurality of longitudinally-extending splines that are formed about the at least the portion of the bore.

3. The side gear of claim 1, wherein the side gear teeth are bevel teeth.

4. A differential comprising:
a differential case;
a ring gear coupled to the differential case;
first and second side gears disposed in the differential case for rotation about a first axis;
first and second pinion gears disposed in the differential case for rotation about a second axis that is generally perpendicular to the first axis, each of the first and second pinions meshingly engaging the first and second side gears;
wherein each of the first and second side gears includes a body with a bore formed therethrough and first and second counterbores formed in one end of the body, the first counterbore having a first diameter and extending a first distance into the body, the second counterbore intersecting the first counterbore, the second counterbore having a second diameter and extending a second distance into the body, wherein the first diameter is greater than the second diameter and the first distance is smaller than the second distance.

5. The differential of claim 4, at least a portion of the bore has a non-circular cross-sectional shape.

6. The differential of claim 5, wherein the non-circular shape is defined by a plurality of longitudinally-extending splines that are formed about the at least the portion of the bore.

7. The differential of claim 4, wherein the first and second pinion gears are bevel pinion gears.

8. An axle assembly comprising:
 an axle housing that defines a chamber;
 an input pinion received through the chamber and rotationally supported by the axle housing for rotation about a first axis;
 a differential assembly received in the chamber and supported for rotation by the axle housing for rotation about a second axis that is perpendicular to the first axis, the differential assembly including:
  a differential case;
  a ring gear coupled to the differential case and meshingly engaged to the input pinion;
  first and second side gears disposed in the differential case for rotation about a first axis;
  first and second pinion gears disposed in the differential case for rotation about a second axis that is generally perpendicular to the first axis, each of the first and second pinions meshingly engaging the first and second side gears;
 wherein each of the first and second side gears includes a body with a bore formed therethrough and first and second counterbores formed in one end of the body, the first counterbore having a first diameter and extending a first distance into the body, the second counterbore intersecting the first counterbore, the second counterbore having a second diameter and extending a second distance into the body, wherein the first diameter is greater than the second diameter and the first distance is smaller than the second distance.

9. The axle assembly of claim 8, wherein the first and second pinion gears are bevel pinion gears.

10. A method for assembling an axle assembly comprising:
 providing a differential case
 assembling a gear set into the differential case, the differential gear set including first and second pinion gears and first and second side gears that are meshingly engaged to the first and second pinion gears, each of the first and second side gears including a body with a bore formed therethrough and first and second counterbores formed in one end of the body, the first counterbore having a first diameter and extending a first distance into the body, the second counterbore intersecting the first counterbore, the second counterbore having a second diameter and extending a second distance into the body, wherein the first diameter is greater than the second diameter and the first distance is smaller than the second distance;
 inserting axle shafts through the bore of the first side gear and second side gears;
 selecting a securing member from a first retainer, which is configured to be received in the first counterbore of the first and second side gears, and a second retainer that is configured to be received in the second counterbore of the first and second side gears;
 installing the securing member to the axle shafts to thereby limit axial movement of the axle shafts in a direction that withdraws the axle shafts from a respective one of the first and second side gears.

* * * * *